United States Patent
Boehlke (10) Patent No.: US 12,445,776 B1
(45) Date of Patent: Oct. 14, 2025

(54) SYSTEMS AND METHODS FOR AUDIO DEVICE INTEROPERABILITY

(71) Applicant: Datavault AI Inc., Beaverton, OR (US)

(72) Inventor: Kenneth A. Boehlke, Portland, OR (US)

(73) Assignee: DATAVAULT AI INC., Beaverton, OR (US)

( * ) Notice: Subject to any disclaimer, the term of this patent is extended or adjusted under 35 U.S.C. 154(b) by 260 days.

(21) Appl. No.: 18/196,924

(22) Filed: May 12, 2023

Related U.S. Application Data (60) Provisional application No. 63/341,167, filed on May 12, 2022.

(51) Int. Cl.

| | | |
|---|---|---|
| *G10L 19/008* | (2013.01) | |
| *G10L 19/005* | (2013.01) | |
| *G10L 25/27* | (2013.01) | |
| *G10L 25/72* | (2013.01) | |
| *H04L 12/28* | (2006.01) | |
| *H04N 7/14* | (2006.01) | |
| *H04N 7/15* | (2006.01) | |
| *H04R 3/04* | (2006.01) | |
| *H04R 3/12* | (2006.01) | |

(52) U.S. Cl.
CPC ............... *H04R 3/12* (2013.01); *G10L 25/27* (2013.01); *G10L 25/72* (2013.01); *H04R 3/04* (2013.01)

(58) Field of Classification Search
None
See application file for complete search history.

(56) References Cited

U.S. PATENT DOCUMENTS

| | | | | |
|---|---|---|---|---|
| 5,619,197 A * | 4/1997 | Nakamura | ............. | H04N 5/602 348/E5.122 |
| 7,400,340 B2 * | 7/2008 | Callan | ..................... | H04N 7/15 348/E7.083 |
| 8,571,027 B2 * | 10/2013 | Nadarajah | ............. | H04L 65/762 370/391 |
| 8,953,695 B2 * | 2/2015 | Ouchi | ............... | H04L 25/03866 370/464 |
| 8,976,961 B2 * | 3/2015 | Bohm | ............. | H04N 21/41422 380/212 |

(Continued)

*Primary Examiner* — Tuan A Tran
(74) *Attorney, Agent, or Firm* — Goodhue, Coleman & Owens, P.C.

(57) ABSTRACT

Systems and methods of the present disclosure enable heterogenous device interoperability for signaling across a network by configuring each transmitter and receiver to implement an interoperability tranche protocol. According to the interoperability tranche protocol, a transmitter generates multiple audio streams based on an original audio signal and a tranche function, where the tranche function is configured to produce the audio streams from the original audio signal at different quality levels. The transmitter transmits the audio streams across a network to each receiver on the network. According to the interoperability tranche protocol, each receiver receives the audio streams and generates an output audio signal based on an interpolator function and the audio streams. The interpolator function combines the audio streams and interpolates missing data from at least one of the audio streams using data from at least one other of the audio stream.

17 Claims, 5 Drawing Sheets

(56) References Cited

U.S. PATENT DOCUMENTS

| | | | |
|---|---|---|---|
| 9,009,337 B2* | 4/2015 | Ronca | H04N 21/44029 709/236 |
| 9,088,690 B2* | 7/2015 | Chang | H04L 12/1813 |
| 9,232,243 B2* | 1/2016 | Hunt | H04N 21/23418 |
| 9,407,941 B2* | 8/2016 | Epstein | H04L 65/756 |
| 9,628,868 B2* | 4/2017 | LaBosco | H04N 21/64322 |
| 9,854,071 B2* | 12/2017 | Ginn | H04L 69/164 |
| 9,854,279 B2* | 12/2017 | Petrov | H04N 21/23608 |
| 10,854,209 B2* | 12/2020 | Atti | G10L 19/005 |
| 11,354,085 B2* | 6/2022 | Swaminathan | G06F 3/012 |
| 2008/0259921 A1* | 10/2008 | Nadarajah | H04L 65/611 370/390 |
| 2009/0219932 A1* | 9/2009 | Kobayashi | H04L 65/65 370/389 |
| 2019/0103118 A1* | 4/2019 | Atti | G10L 19/008 |

* cited by examiner

SYSTEMS AND METHODS FOR AUDIO DEVICE INTEROPERABILITY

CROSS REFERENCE TO RELATED APPLICATIONS

This application claims priority to U.S. Provisional Application No. 63/341,167 filed on 12 May 2022 and entitled "SYSTEMS AND METHODS FOR AUDIO DEVICE INTEROPERABILITY," and is herein incorporated by reference in its entirety.

FIELD OF THE DISCLOSURE

The present disclosure is related generally to the wireless distribution of audio signals and, in particular to a system and methods of distributing audio wirelessly to a variety of devices having a variety of differing capabilities.

BACKGROUND

Interoperability in wireless systems is typically determined by an interrogation of capabilities of all the devices connected to a network and then a mode is selected that all devices support. This approach selects the lowest common denominator of capabilities and negates the capabilities of the best devices connected.

SUMMARY

The present disclosure provides for novel systems and methods of audio transmission that alleviate shortcomings in the art, and provide novel mechanisms for audio device interoperability with a network.

An aspect of the present disclosure is a method of audio transmission. In some embodiments, a method of audio transmission may receive, by a transmitter, an original audio signal; generate, by the transmitter, a plurality of audio streams based at least in part on the original audio signal and a tranche function; where the tranche function is configured to produce the plurality of audio streams including the original audio signal at a plurality of quality levels; and transmit, by the transmitter, the plurality of audio streams across a network to each receiver.

In some aspects, the techniques described herein relate to a method, where the plurality of quality levels are defined by at least one of: bit rate, bit depth, sampling rate, or error correction.

In some aspects, the techniques described herein relate to a method, further including interleaving, by the transmitter, each audio stream of the plurality of audio streams using a respective interleaver of a plurality of interleavers.

In some aspects, the techniques described herein relate to a method, where the network includes a wireless network.

In some aspects, the techniques described herein relate to a method including: receiving, by a receiver, a plurality of audio streams from a transmitter across a network; where the plurality of audio streams include an original audio signal at a plurality of quality levels; and generating, by the receiving, an output audio signal based at least in part on an interpolator function and the plurality of audio streams; where the interpolator function is configured to: combine the plurality of audio streams, and interpolate missing data from at least one audio stream of the plurality of audio streams using data from at least one other audio stream of the plurality of audio stream.

In some aspects, the techniques described herein relate to a method, where the plurality of quality levels are defined by at least one of: bit rate, bit depth, sampling rate, or error correction.

In some aspects, the techniques described herein relate to a method, further including de-interleaving, by the receiver, each audio stream of the plurality of audio streams using a respective de-interleaver of a plurality of de-interleavers.

In some aspects, the techniques described herein relate to a method, where the network includes a wireless network.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

The detailed description provided herein is not intended as an extensive or detailed discussion of known concepts, and as such, details that are known generally to those of ordinary skill in the relevant art may have been omitted or may be handled in summary fashion.

FIGS. 1 through 4 illustrate systems and methods of interoperability of heterogenous devices over a network. The following embodiments provide technical solutions and/or technical improvements that overcome technical problems, drawbacks and/or deficiencies in the technical fields involving device interoperability that typically relies on identifying the lowest set of capabilities of devices on the network and producing a signal that targets the lowest set of capabilities, which results in low quality signals when even a single device requiring the low quality signal is present. As explained in more detail, below, technical solutions and/or technical improvements herein include aspects of improved device interoperability on the network that uses tranches of network with each tranche targeting a different quality level so that a signal can be optimized for each device in a heterogenous set of devices having different capabilities so that a device having the lowest set of capabilities does not impose low signal quality on a device with greater capabilities. Based on such technical features, further technical benefits become available to users and operators of these systems and methods. Moreover, various practical applications of the disclosed technology are also described, which provide further practical benefits to users and operators that are also new and useful improvements in the art.

Certain embodiments will now be described in greater detail with reference to the figures.

Figure 1:
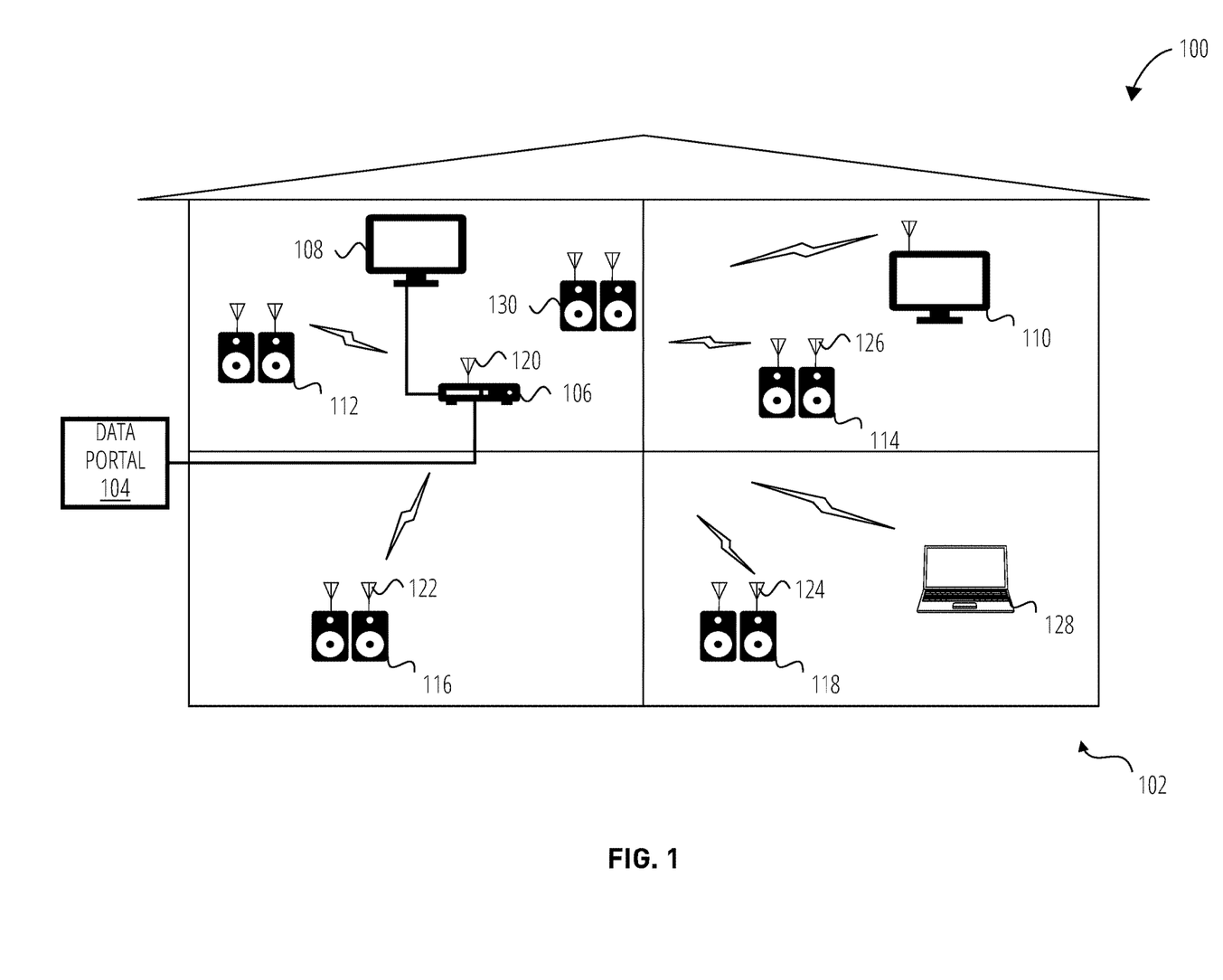
FIG. 1 is a block diagram illustrating non-limiting components of a general environment according to some embodiments of the present disclosure.

Referring now to FIG. 1, FIG. 1 illustrates an environment 100 according to some embodiments of the present disclosure. FIG. 1 shows components of a general environment in which the systems and methods discussed herein may be practiced. Not all the components may be required to practice the disclosure, and variations in the arrangement and type of the components may be made without departing from the spirit or scope of the disclosure.

According to some embodiments, in a building or residence 102 data, including video and audio data, may be retrieved from a storage medium, such as a DVD by a DVD player or from a data portal 104 connected to, for example, a wide area fiber optic network or a satellite receiver, and distributed throughout the residence. For example, in some embodiments, digital video and/or multi-channel audio may be distributed from a source 106 (e.g., DVD player, gaming console, computer, mobile device, and the like) for presentation by displays 108 and 110 and/or surround sound or stereo speaker units 112, 114, 116, 118 through 130 in different rooms of residence 102. In some embodiments, at least part of the distribution network may comprise one or more radio transmitters 120 which may be part of a source 106 and one or more radio receivers 122, 124 through 126 which may be incorporated in the networked devices such as a computer 128, a video display 110, or the speakers 112-118 of one or more a stereo or surround sound systems.

As will be noted, in some embodiments, synchronization of the various outputs and minimization of system latency may be essential to high quality audio/video systems. As will be further noted, source-to-output delay or latency ("lip-sync") is important in audio/video systems, such as home theater systems, where a slight difference (e.g., on the order of 50 milliseconds (ms)) between display of a video sequence and the output of the corresponding audio is noticeable. On the other hand, the human ear is even more sensitive to phase delay or channel-to-channel latency between the corresponding outputs of the different channels of multi-channel audio. In some embodiments, channel-to channel latency greater than 1 microsecond (us) may result in the perception of disjointed or blurry audio.

Audio video bridging (AVB) is the common name of a set of technical standards developed by the Institute of Electrical and Electronics Engineers (IEEE) and providing specifications for time-synchronized, low latency, streaming services over networks. "IEEE 108.1AS-2011—IEEE Standard for Local and Metropolitan Area Networks—Timing and Synchronization for Time-Sensitive Applications in Bridged Local Area Networks" describes a system for synchronizing clocks distributed among the nodes of one or more networks of devices.

According to some embodiments, in an audio video bridging (AVB) network, each network endpoint (e.g., a network node capable of transmitting and/or receiving a data stream) may include two clocks-a "wall" clock and a "media" or "sample" clock. In some embodiments, wall time output by the wall clock may determine the real or actual time of an event's occurrence and/or the real or actual time difference between the initiation of a task and the task's completion. In some embodiments, a sample clock may be an alternating signal which may control the rate at which data is passed to a media processing device for processing. For examples, in an embodiment, in a digital audio system, sample clocks may govern the rate at which an analog signal is sampled and the rate at which digital samples are to be passed to a digital-to-analog converter (DAC) controlling the emission of sound by a speaker.

Figure 2:
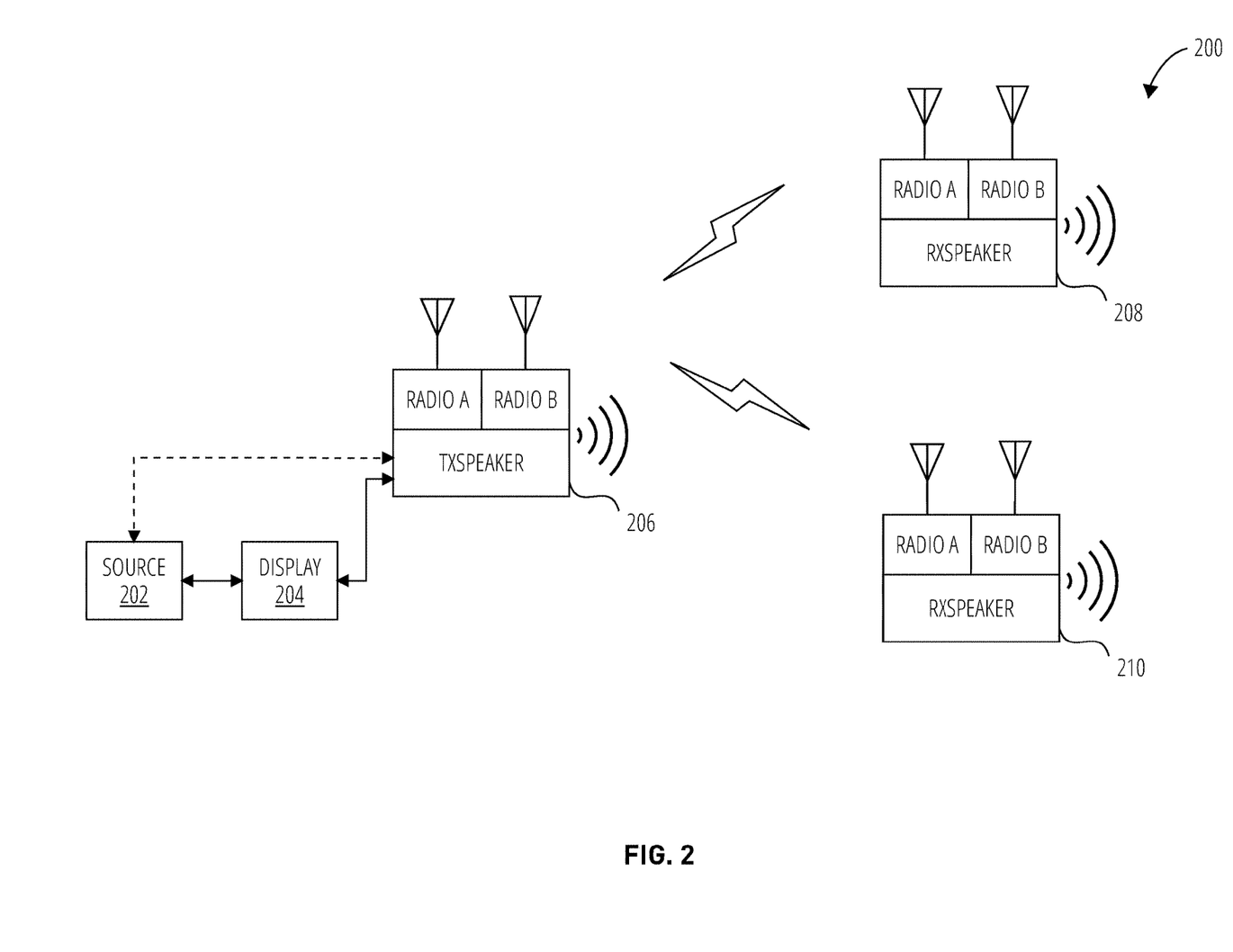
FIG. 2 is a block diagram illustrating components of data transmission network according to some embodiments of the present disclosure.

In general, with reference to FIG. 2, a system 200 in accordance with an embodiment of the present disclosure is shown. FIG. 2 shows components of a general environment in which the systems and methods discussed herein may be practiced. Not all the components may be required to practice the disclosure, and variations in the arrangement and type of the components may be made without departing from the spirit or scope of the disclosure. In some embodiments, different components of system 200 may be combined into a single device.

As shown, system 200 of FIG. 2 may include a data source 202, display 204, a transmitter-speaker (TxSpeaker) 206, and one or more receiver-speakers (e.g., RxSpeakers 208 and 210). In some embodiments, source 202 may be a source of digital audio and/or video. In some embodiments, source 202 may transmit an audio/video stream including a plurality of packets. In some embodiments, source 202 may be a media player, a gaming console, a mobile device, or any other device capable of reproducing and/or transmitting media. In some embodiments, an audio/video stream may be provided to a display 204 for displaying (e.g., a television, a projector, a display monitor) visual media associated with the audio/video stream.

For example, in an embodiment, where the source 202 is a gaming console, source 202 may transmit audio and/or graphics corresponding to gameplay to the display 204. In turn, display 204 may display the graphics. In some embodiments, an audio component of a media stream may be transmitted directly from the source 202 to the TxSpeaker 206. In some embodiments, the media steam may be transmitted from the source 202 to the display 204 and, in turn, the display 204 may transmit audio information corresponding to the media stream to the TxSpeaker 206.

According to some embodiments, TxSpeaker 206 may process the audio information and transmit the processed or transformed audio information to the one or more RxSpeakers (e.g., 208 and RxSpeaker 210).

According to some embodiments, system 200 may be a multi-radio architecture. In some embodiments, data transmitters and receivers of system 200 may utilize one or more radio chains to communicate. For example, in the non-limiting embodiment of FIG. 2, TxSpeaker 206 and RxSpeakers 208 and 210 have two radio chains Radio A and Radio B. In some embodiments, TxSpeaker 206 and RxSpeakers 208 and 210 may have one or more radio chains.

In an embodiment, TxSpeaker 206 and RxSpeakers 208 and 210 may communicate through independent radio chains. For example, in some embodiments, TxSpeaker 206 may communicate with RxSpeakers 208 and 210 through Radio A, Radio B, or both. It will be noted that, in some embodiments, any radio chain of TxSpeaker 206 and RxSpeakers 208 and 210 may communicate with any other radio chain. For example, in some embodiments, TxSpeaker 206 may use Radio A to communicate with Radio B of RxSpeaker 208 while communicating with Radio A of RxSpeaker 210. In some embodiments, any TxSpeaker or RxSpeaker may communicate with any other of TxSpeaker or RxSpeaker using any type of digital communications (including wired and wireless) known or to be known without departing from the scope of the present disclosure.

According to some embodiments, Radio A and Radio B may use Channel A and Channel B, respectively. In some embodiments, Channel A and Channel B may have a channel frequency. In some embodiments, Channel A and Channel B may be separated in channel frequency or band of operation (e.g., Frequency Diversity). In some embodiments, Channel A and Channel B may in the same band but have different bandwidths (e.g., 20/40/80/160 MHz bandwidth in 802.11ac). In some embodiments, Channel A and Channel B may be separated in time (e.g., Temporal Diversity). That is, in some embodiments, data packets may be sent over Channel A and/or Channel B at a different time slots to overcome a burst interference that has interfered with a primary time slot.

According to some embodiments, Channel A and Channel B may be separated in a Modulation Coding Scheme (e.g., Coding Diversity). That is, in some embodiments, data packets may be sent using different physical layer rates of a f a wireless network protocol. For example, in some embodiment, a physical layer rate may be 6 Mbps using Binary Phase-Shift Keying (BPSK) and a coding rate of ½ as disclosed in 802.11a. In some embodiments, a physical layer rate may be 54 Mbps using 64-QAM scheme and a coding rate of ¾ as disclosed in 802.11a.

According to some embodiments, Channel A and Channel B may have different communication methods (e.g., Broadcast/Multicast v. Unicast). In some embodiments, where the channel communication method is Broadcast/Multicast, data packets may be transmitted to multiple receivers at the same time. In some embodiments, where the channel communication method is unicast, a transmitter may transmit data packets to individual receivers independently. It will be noted that as used herein, any of TxSpeaker 206, RxSpeaker 208, and RxSpeaker 210 may act be a receiver, a transmitter, or both.

According to some embodiments, Channel A and Channel B may have different retransmission methods (e.g., User Datagram Protocol (UDP), Transmission Control Protocol/Internet Protocol (TCP/IP)). In some embodiments, where the retransmission method is UDP, data packets may be sent without acknowledgment. In some embodiments, where the retransmission method is TCP/IP, acknowledgment of packet loss and retransmission of lost packets is supported.

According to some embodiments, Channel A and Channel B may use different radio Physical Layers (e.g., Orthogonal Frequency Domain Multiplexing (OFDM) as disclosed in 802.11a/n/ac, Frequency Hopping Spread Spectrum (FHSS) as disclosed by the Bluetooth standard, and Code Division Multiple Access (CDMA) as disclosed in 802.11b). In some embodiments, different Physical Layers can cover the same frequency band but use different medium access methods and spectral reuse properties. For example, in some embodiments, 802.11g and Bluetooth both share the 2.4 GHz Band, however, 802.11g may move from one 20 MHz Channel to another while Bluetooth dynamically may hop over an entire 80 MHz band in one packet period.

Figure 3:
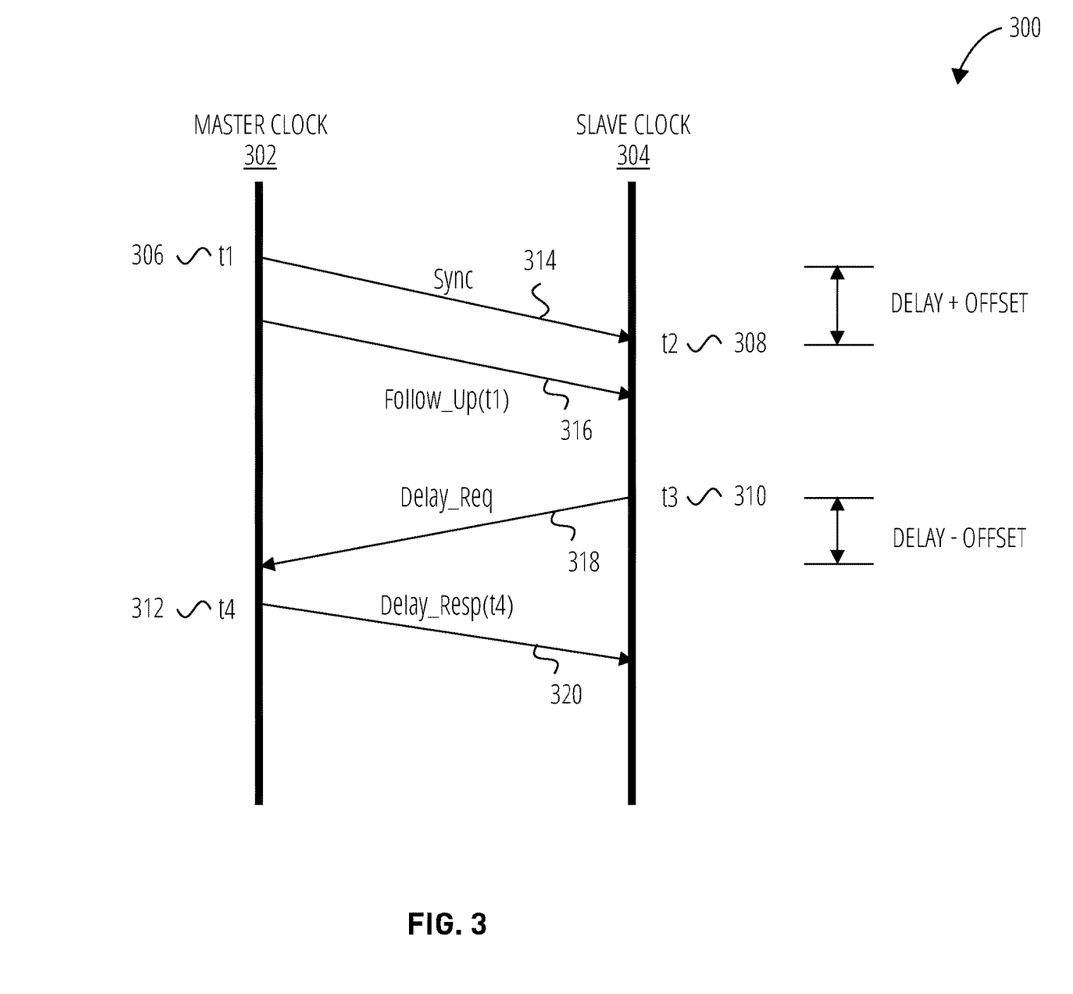
FIG. 3 illustrates a method for synchronizing clocks among devices in a network according to some embodiments of the present disclosure.

Referring now to FIG. 3, FIG. 3 illustrates a method for synchronizing clocks among devices in a network according to some embodiments of the present disclosure. FIG. 3 illustrates a Precision Time Protocol (PTP) of "IEEE Standard for a Precision Clock Synchronization Protocol for Networked Measurement and Control Systems," IEEE Std. 1588-2008 which provides, inter alia, a method 300 of synchronizing a wall time at "slave" clock 304 distributed among the nodes of a network to a wall time of the network's "master" clock 302.

According to some embodiments, when operation of a network is initiated, a master clock 302 may be selected either manually or by a "best master clock" algorithm. Afterward, messages may be periodically exchanged between a device comprising the master clock 302 (e.g., the "master device") and the network devices comprising the slave clocks 304 (e.g., the "slave devices") enabling determination of an offset, the time by which a slave clock leads or lags the master clock, and the network delay, the time required for data packets to traverse the network.

In some embodiments, at defined intervals (e.g., two second intervals) the master device may multicasts a Sync message 314 to the other network devices. In some embodiments, the precise master clock 302 wall time of the Sync message's transmission, t1 306, is determined and included as a timestamp in either the Sync message 314 or in a Follow-Up message 316. In some embodiments, the slave device determines the local wall time, t2 308, at which the device received the Sync message 314.

In some embodiments, a Delay_Req message 318 may then be sent by the slave device to the master device at time, t3 310. In some embodiments, the master clock's time of receipt, t4 312, of the Delay_Req message 318 is determined and the master device responds with a Delay_Resp message 320 which includes a timestamp indicating t4 312. In some embodiments, the slave device may then determine the network delay and the slave clock's offset from the four times, t1 306, t2 308, t3 310, and t4 312:

$$\text{Delay} + \text{Offset} = t2 - t1 \quad (1)$$

$$\text{Delay} - \text{Offset} = t4 - t3 \quad (2)$$

$$\text{Delay} = ((t2-t1) + (t4-t3))/2 \quad (3)$$

$$\text{Offset} = ((t2-t1) - (t4-t3))/2 \quad (4)$$

In some embodiments, consecutive measurements of the offset also permit compensation for the slave clock's frequency drift. In some embodiments, with the time and frequency drift determined, each slave clock may be adjusted to match the wall time of the master clock by adding or subtracting the offset to or from the local wall time and adjusting the slave clock's frequency.

As will be noted, IEEE 802.11, "IEEE Standard for Information Technology—Telecommunications and Information Exchange Between Systems Local and Metropolitan Area Networks" provides media access control (MAC) and physical layer (PHY) specifications for implementing wireless local area networks (WLAN) referred to basic service sets (BSS). The devices which are parts of a BSS are identified by a service set identification (SSID) which may be assigned or established by the device which starts the network. In some embodiments, each network device or station includes a local timing synchronization function (TSF) timer. In some embodiments, the device's wall clock may be based on a 1 mega-Hertz (MHz) clock which ticks in microseconds. In some embodiments, during a beacon period, all stations in an independent basic service set (IBSS) may compete to transmit a beacon. In some embodiments, each station may calculate a random delay interval and may set a delay timer scheduling transmission of a beacon when the timer expires. In some embodiments, if a beacon arrives before the delay timer expires, the receiving station may cancel its pending beacon transmission. In some embodiments, the beacon may comprise a beacon frame including a timestamp indicating the TSF timer value (e.g., the wall time) of the station that transmitted the beacon. In some embodiments, upon receiving a beacon, if the timestamp is later than the receiving station's TSF timer, the receiving station may set its TSF timer (e.g., the wall clock), to the value of the timestamp thus synchronizing the TSF timers (e.g., the wall clocks) of the transmitting station and the receiving station.

In some embodiments, PTP and TSF are responsible for synchronizing the wall clocks of all nodes in the respective network to the same wall time but not for synchronizing the sample clocks controlling the processing of the various media transported by the network. In some embodiments, the sample clocks may be recovered from the data stream at each of the network's listeners (e.g., endpoints receiving the data stream) enabling different sample clocks for different media to be transported on the same network.

Figure 4:
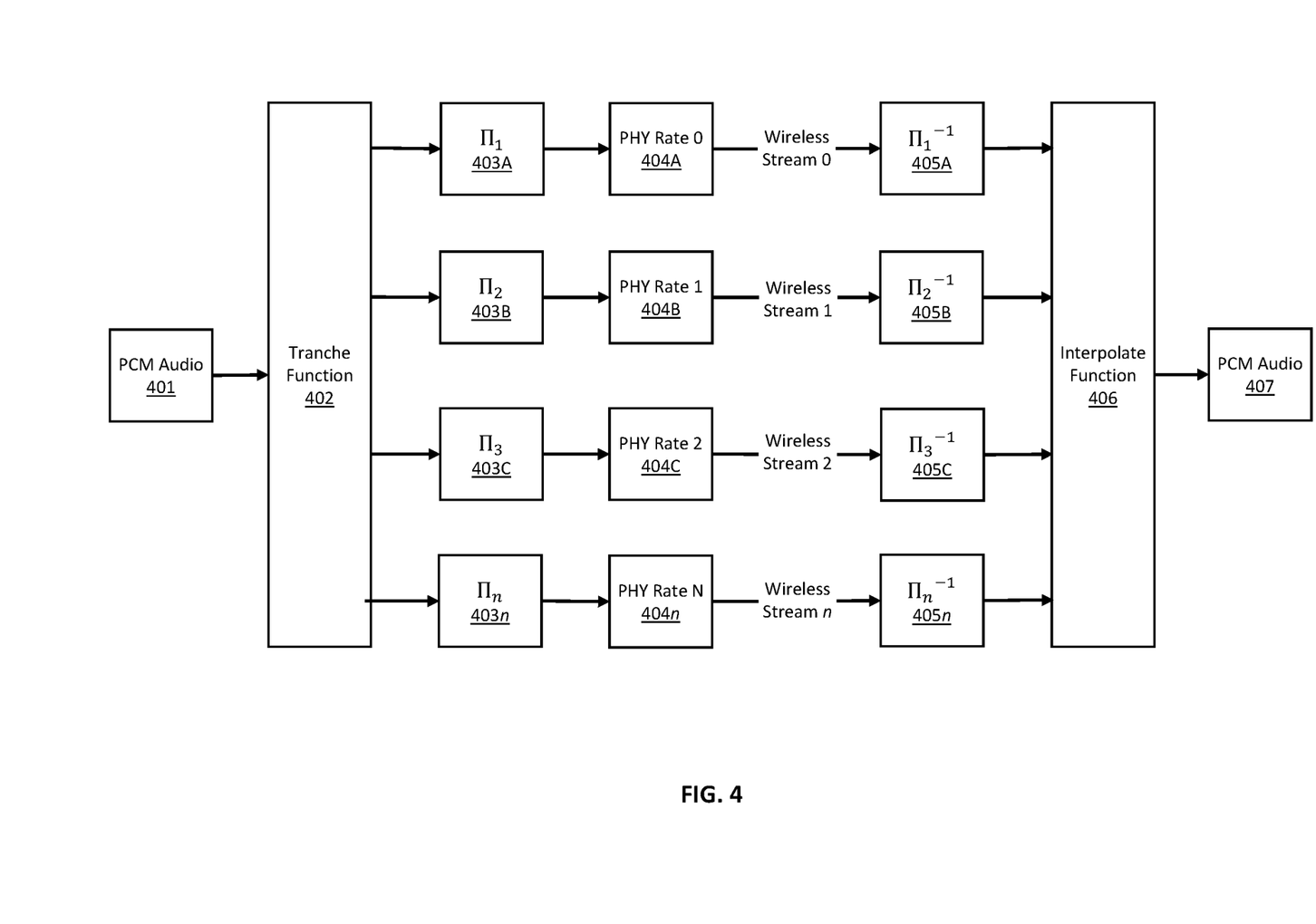
FIG. 4 illustrates tranches of a network for parallel wireless streams with varying levels of quality according to some embodiments of the present disclosure.

Turning now to FIG. 4, FIG. 4 illustrates tranches of a network for parallel wireless streams with varying levels of quality according to some embodiments of the present disclosure.

Aspects of some embodiments of the present disclosure may employ a network of devices configured to uses multicast/groupcast transmission where each transmission packet goes to all receiver devices in the network. However, the audio sample rate of the devices may be mixed. For example, some devices may support 48 kHz, some 96 kHz, and a few support 192 kHz. The network may employ one or more embodiments of a device interoperability tranche protocol to enable every device to maximize its capability because the audio data is organized additively over rate rather than separately enumerated. Each end user device may be configured to employ the device interoperability tranche protocol. Thus, each end user devices can be from different vendors and have different price and performance points while being able interoperate and perform at the capabilities of each end user device.

Interoperability in other systems is determined by an interrogation of capabilities of all the devices connected to the network and then a mode is selected that all devices support. This approach selects the lowest common denominator of capabilities and negates the capabilities of the best devices connected.

TABLE 1

|  |  | Throughput in Mbps (24 bit audio) | |
|---|---|---|---|
|  |  | Raw Rate | Extended Rate |
| Audio | 48K | 1.1520 | 1.1520 |
| Rate | 96K | 2.3040 | 1.1520 |
|  | 192K | 4.6080 | 2.3040 |

In some embodiments, input audio data, such as PCM audio 401 or other suitable audio format, in the network is divided into Tranches (slices ranked by audio quality) by a tranche function 402 by scaling of audio across tranches based on bit rate, bit depth, sampling rate, error correction, among other properties of each stream of audio or any combination thereof. In an example, the tranche function 402 may create multiple tranches, including a first, lowest, tranche (Stream 0), e.g., at a greatly reduced 12 kHz audio sample rate and an 8 bit mantissa depth (low SNR used in error concealment only), a second tranche (Stream 1), e.g., at 48 kHz with a Normal bit depth, a third tranche (Stream 2), e.g., at 96 kHz with an Extended bit depth, through the highest tranche (Stream 3), e.g., sampling at 192 kHz and a full 24 bit depth.

The streams are sent out over the air at progressive higher data rates (lower data rates are more robust) so that the most critical audio information is most likely to make it across the link given a finite medium capacity and range requirement.

Each stream is independently interleaved ($\pi$) by interleavers 403A, 403B, 403C through 403n before transmission and de-interleaved ($\pi^{-1}$) by de-interleavers 405A, 405B, 405C through 405n at reception so that lost packet data is spread over time making the error concealment interpolation process more effective. In some embodiments, interleavers 403A, 403B, 403C through 403n may transmit respective wireless streams 0, 1, 2, through n over respective physical layer (PHY) rate 0 404A, PHY rate 1 404B, PHY rate 2 404C through PHY rate N 404n, creating n separate interleaved wireless streams 0 through n.

The error concealment interpolator function 406 combines the data from all applicable streams and then interpolates the missing data from the combined data in order to reproduce and output PCM audio 407. Data from Stream 0 (SNR Reduced) is included in the interpolation process when it improves the accuracy of the result.

The Extended Streams (if available in the audio content) contain the additional information to complete that data rate. For example, Stream 2 contains the 96 kHz sample not sent in Stream 1 and Stream 3 contains the 192 kHz samples not sent in Stream 1 or Stream 2. Source streams that exceed the capability of a sink are received but not processed by it.

In the network the audio source device (tv, set top box, cell phone, . . . ) rate and audio sink device (speaker, headphones, . . . ) rate of the connection may determine the used audio rate.

TABLE 2

|  |  | Audio Sink Device Rate Capability | | |
|---|---|---|---|---|
|  |  | 48K | 96K | 192K |
| Audio | 48K | 48K | 48K | 48K |
| Source Device | 96K | 48K | 96K | 96K |
| Rate | 192K | 48K | 96K | 192K |

As illustrated in Table 2 above that all devices can interoperate without having to change the network configuration and each device get the highest audio performance that is available and that it can support.

Figure 5:
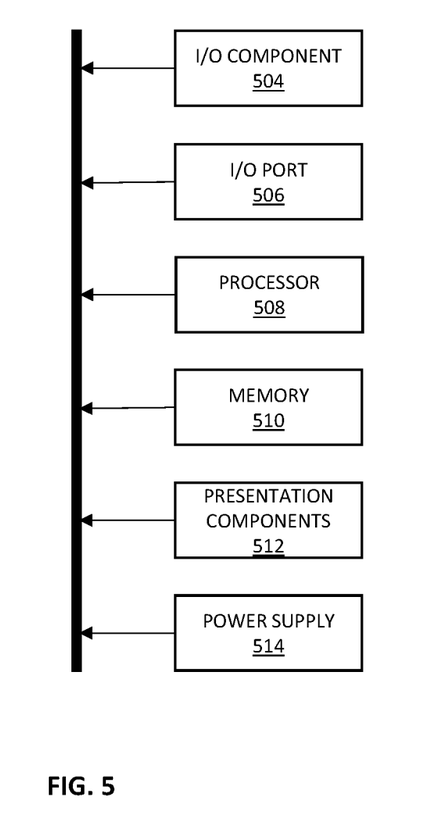
FIG. 5 is a schematic diagram illustrating an example embodiment of a device according to some embodiments of the present disclosure.

Turning now to FIG. 5, FIG. 5 is a schematic diagram illustrating an example embodiment of a device (e.g., a client device, a computing device) that may be used within the present disclosure. In some embodiments, device may be a source 202, a display 204, a TxSpeaker 206, a RxSpeaker 208, a RxSpeaker 210, or a combination thereof as described with respect to FIG. 2. The device is merely an illustrative example of a suitable computing environment and in no way limits the scope of the present disclosure. As used herein, a "device" or "computing device" can include a "workstation," a "server," a "laptop," a "desktop," a "hand-held device," a "mobile device," a "tablet computer," or other computing devices, as would be understood by those of skill in the art. Embodiments of the present disclosure may utilize any number of devices in any number of different ways to implement a single embodiment of the present disclosure. Accordingly, embodiments of the present disclosure are not limited to a single device, as would be appreciated by one with skill in the art, nor are they limited to a single type of implementation or configuration of the example device.

In some embodiments, device may include a bus 502 that can be coupled to one or more of the following illustrative components, directly or indirectly: input/output (I/O) component 504, I/O port 506, one or more processors 508, one or more memories 510, one or more presentation components 512, and power supply 514. One of skill in the art will appreciate that the bus 502 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices.

In some embodiments, device can include or interact with a variety of computer-readable media. For example, computer-readable media can include Random Access Memory (RAM), Read Only Memory (ROM), Electronically Erasable Programmable Read Only Memory (EEPROM), flash memory or other memory technologies, CD-ROM, digital versatile disks (DVD) or other optical or holographic media, and magnetic storage devices that can be used to encode information and can be accessed by the devices.

In some embodiments, memory 510 can include computer-storage media in the form of volatile and/or nonvolatile memory. In some embodiments, memory 510 may be removable, non-removable, or any combination thereof. For example, in some embodiments, memory 510 may be a hardware device such as hard drives, solid-state memory, optical-disc drives, and the like.

In some embodiments, device can include one or more processors that read data from components such as the memory 510, the various I/O components 504, etc. In some embodiments, presentation components 512 present data indications to a user or other device. For example, in some embodiments, presentation components 512 may include a display device, speaker, a printing component, a haptic component, etc.

In some embodiments, the I/O ports 506 can enable the device to be logically coupled to other devices, such as I/O components 504. In some embodiments, some of the I/O components 504 can be built into the device. In some embodiments, I/O component 504 may be a microphone, joystick, recording device, game pad, satellite dish, scanner, printer, wireless device, networking device, and the like. In some embodiments, I/O port 506 may utilize one or more communication technologies, such as USB, infrared, Bluetooth™, or the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:
   receiving, by a transmitter, an input audio signal;
   generating, by the transmitter, a plurality of audio streams based at least in part on the input audio signal and a tranche function;
   wherein the tranche function is configured to produce the plurality of audio streams comprising the input audio signal at a plurality of quality levels;
   transmitting, by the transmitter, the plurality of audio streams across a network to each receiver;
   wherein the plurality of quality levels comprise at least four quality levels comprising:
      a lowest tranche having a 12 kHz audio sample rate with an 8 bit mantissa depth,
      a second tranche having a 48 KHz audio sample rate with a Normal bit depth,
      a third tranche having a 96 KHz audio sample rate with an Extended bit depth, and
      a fourth tranche having a full 24 bit depth.

2. The method of claim 1, wherein the plurality of quality levels are further defined by at least one of:
   bit rate, or
   error correction.

3. The method of claim 1, wherein the lowest tranche comprises a lowest signal to noise ratio (SNR) to enable error concealment.

4. The method of claim 1, wherein the network comprises a wireless network.

5. A method comprising:
   receiving, by a transmitter, an input audio signal;
   generating, by the transmitter, a plurality of audio streams based at least in part on the input audio signal and a tranche function;
   wherein the tranche function is configured to produce the plurality of audio streams comprising the input audio signal at a plurality of quality levels;
   transmitting, by the transmitter, the plurality of audio streams across a network to each receiver; and
   interleaving, by the transmitter, each audio stream of the plurality of audio streams using a respective interleaver of a plurality of interleavers.

6. A method comprising:
   receiving, by a receiver, a plurality of audio streams from a transmitter across a network;
   wherein the plurality of audio streams comprise an input audio signal at a plurality of quality levels; and
   generating, by the receiving, an output audio signal based at least in part on an interpolator function and the plurality of audio streams;
   wherein the interpolator function is configured to:
      combine the plurality of audio streams, and
      interpolate missing data from at least one audio stream of the plurality of audio streams using data from at least one other audio stream of the plurality of audio stream.

7. The method of claim 6, wherein the plurality of quality levels are defined by at least one of:
bit rate,
bit depth,
sampling rate, or
error correction.

8. The method of claim 6, wherein the plurality of quality levels comprise at least four quality levels comprising:
a lowest tranche having a 12 kHz audio sample rate with an 8 bit mantissa depth,
a second tranche having a 48 KHz audio sample rate with a Normal bit depth,
a third tranche having a 96 KHz audio sample rate with an Extended bit depth, and
a fourth tranche having a full 24 bit depth.

9. The method of claim 8, wherein the lowest tranche comprises a lowest signal to noise ratio (SNR) to enable error concealment.

10. The method of claim 6, further comprising de-interleaving, by the receiver, each audio stream of the plurality of audio streams using a respective de-interleaver of a plurality of de-interleavers.

11. The method of claim 6, wherein the network comprises a wireless network.

12. A system comprising:
at least one transmitter configured to:
receive an input audio signal;
generate a plurality of audio streams based at least in part on the input audio signal and a tranche function;
wherein the tranche function is configured to produce the plurality of audio streams comprising the input audio signal at a plurality of quality levels;
transmit the plurality of audio streams across a network to at least one receiver; and
at least one receiver configured to:
receive the plurality of audio streams from the at least one transmitter across the network; and
generate an output audio signal based at least in part on an interpolator function and the plurality of audio streams;
wherein the interpolator function is configured to:
combine the plurality of audio streams, and
interpolate missing data from at least one audio stream of the plurality of audio streams using data from at least one other audio stream of the plurality of audio stream.

13. The system of claim 12, wherein the plurality of quality levels are defined by at least one of:
bit rate,
bit depth,
sampling rate, or
error correction.

14. The system of claim 12, wherein the plurality of quality levels comprise at least four quality levels comprising:
a lowest tranche having a 12 kHz audio sample rate with an 8 bit mantissa depth,
a second tranche having a 48 KHz audio sample rate with a Normal bit depth,
a third tranche having a 96 KHz audio sample rate with an Extended bit depth, and
a fourth tranche having a full 24 bit depth.

15. The system of claim 14, wherein the lowest tranche comprises a lowest signal to noise ratio (SNR) to enable error concealment.

16. The system of claim 12, wherein the at least one processor, upon execution of the software instructions, is further configured to interleave each audio stream of the plurality of audio streams using a respective interleaver of a plurality of interleavers.

17. The system of claim 12, wherein the at least one processor, upon execution of the software instructions, is further configured to de-interleave each audio stream of the plurality of audio streams using a respective de-interleaver of a plurality of de-interleavers.

* * * * *